United States Patent
Au et al.

(10) Patent No.: US 10,162,605 B2
(45) Date of Patent: Dec. 25, 2018

(54) CODE SNIPPET CONTENT RECOMMENDATION TO DEFINE AN OBJECT LITERAL

(71) Applicant: Microsoft Technology Licensing, LLC, Redmond, WA (US)

(72) Inventors: Yinghung Au, Redmond, WA (US); Nikhil Khandelwal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/249,244

(22) Filed: Aug. 26, 2016

(65) Prior Publication Data

US 2018/0024816 A1 Jan. 25, 2018

Related U.S. Application Data

(60) Provisional application No. 62/364,844, filed on Jul. 20, 2016.

(51) Int. Cl.
*G06F 9/44* (2018.01)
*G06F 8/33* (2018.01)

(52) U.S. Cl.
CPC .................................. *G06F 8/33* (2013.01)

(58) Field of Classification Search
CPC ....................................... G06F 8/33; G06F 8/32
USPC ................ 717/101–108, 120–122, 107–109, 717/126–128, 140–141, 101–104
See application file for complete search history.

(56) References Cited

U.S. PATENT DOCUMENTS

| | | | |
|---|---|---|---|
| 5,675,801 A * | 10/1997 | Lindsey | G06F 8/30 717/108 |
| 5,875,331 A * | 2/1999 | Lindsey | G06F 8/10 717/108 |
| 6,385,769 B1 * | 5/2002 | Lewallen | G06F 8/20 717/116 |
| 6,633,888 B1 * | 10/2003 | Kobayashi | G06F 8/34 |
| 7,210,097 B1 * | 4/2007 | Clarke | G06F 17/30917 707/999.202 |
| 7,627,861 B2 * | 12/2009 | Smith | G06F 8/75 717/137 |

(Continued)

OTHER PUBLICATIONS

Galenson et al, "CodeHint: Dynamic and Interactive Synthesis of Code Snippets ", ACM, pp. 653-663, 2014.*

(Continued)

*Primary Examiner* — Anil Khatri
(74) *Attorney, Agent, or Firm* — Wade IP Law LLC

(57) ABSTRACT

Techniques are described herein that are capable of recommending content of a code snippet to define an object literal. For instance, information regarding one or more properties of the object literal is determined. The content of the code snippet is recommended to define the object literal based at least in part on the information. The content identifies the one or more properties of the object literal. In a first example, the information may be determined from comment(s) that are included in code. In a second example, a proxy object may be provided to a function that is included in code. In accordance with this example, the information regarding the one or more properties of the object literal may be determined using global dynamic analysis based at least in part on a getter trap that is encountered during execution of the function with regard to the proxy object.

20 Claims, 12 Drawing Sheets

(56) References Cited

U.S. PATENT DOCUMENTS

| | | | | |
|---|---|---|---|---|
| 8,214,900 | B1* | 7/2012 | Satish | G06F 21/554 |
| | | | | 726/23 |
| 8,321,836 | B2* | 11/2012 | Meijer | G06F 8/33 |
| | | | | 717/113 |
| 8,336,030 | B1* | 12/2012 | Boissy | G06F 8/71 |
| | | | | 717/122 |
| 8,386,960 | B1 | 2/2013 | Eismann et al. | |
| 8,429,637 | B2* | 4/2013 | Myles | G06F 21/14 |
| | | | | 712/208 |
| 8,490,117 | B1* | 7/2013 | Brichford | G06F 9/45512 |
| | | | | 717/115 |
| 8,584,109 | B2* | 11/2013 | Anckaert | G06F 21/53 |
| | | | | 717/148 |
| 8,863,079 | B2* | 10/2014 | Darcy | G06F 8/437 |
| | | | | 717/108 |
| 8,869,140 | B2* | 10/2014 | Todorova | G06F 8/61 |
| | | | | 717/126 |
| 9,170,782 | B2 | 10/2015 | Carter et al. | |
| 9,305,165 | B2* | 4/2016 | Snow | G06F 21/53 |
| 9,317,694 | B2* | 4/2016 | Arbabi | G06F 21/577 |
| 9,582,666 | B1* | 2/2017 | Overson | G06F 21/572 |
| 9,710,361 | B2* | 7/2017 | Dhoolia | G06F 11/3664 |
| 9,756,110 | B2* | 9/2017 | Lam | H04L 67/02 |
| 9,805,203 | B2* | 10/2017 | Johns | G06F 21/577 |
| 2009/0119675 | A1 | 5/2009 | Higgins et al. | |
| 2012/0084750 | A1 | 4/2012 | Hardy et al. | |
| 2014/0067866 | A1 | 3/2014 | Chen | |
| 2014/0201709 | A1 | 7/2014 | Euerle | |
| 2014/0282443 | A1 | 9/2014 | Hoban et al. | |
| 2014/0359574 | A1 | 12/2014 | Beckwith et al. | |
| 2016/0077853 | A1 | 3/2016 | Feng et al. | |

OTHER PUBLICATIONS

Yang et al, " From Query to Usable Code: An Analysis of Stack Overflow Code Snippets ", ACM, pp. 391-401, 2016.*

Flanagan et al, "The ROADRUNNER Dynamic AnalysisFramework for Concurrent Programs", ACM, pp. 1-8, 2010.*

Stroulia et al, "Dynamic Analysis for Reverse Engineering and Program Understanding", ACM, pp. 8-17, 2002.*

Yi et al, "SideTrack: Generalizing Dynamic Atomicity Analysis", ACM, pp. 1-10, 2009.*

Schafer et al, "Dynamic Determinacy Analysis", ACM, pp. 165-174, 2013.*

Spirin et al, "Unsupervised Approach to Generate Informative Structured Snippets for Job Search Engines", ACM, pp. 203-204, 2013 (Year: 2013).*

Liu et al, "Improving XML Search by Generating and Utilizing Informative Result Snippets", ACM Transactions on Database Systems, vol. 35, No. 3, Article 19, pp. 1-45, 2010 (Year: 2010).*

Bast et al, "Efficient Index-Based Snippet Generation", ACM Transactions on Information Systems, vol. 32, No. 2, Article 6, pp. 1-24, 2014. (Year: 2014).*

Chen et al, "Modeling Queries with Contextual Snippets for Information Retrieval", ACM Transactions on Intelligent Systems and Technology, vol. 9, No. 4, Article 47, pp. 1-26, 2018 (Year: 2018).*

"Tern: intelligent JavaScript tooling", Published on: Jan. 19, 2015, 5 pages, Available at: http://temjs.net/.

"Code Completion (IntelliSense)", Retrieved on: Jul. 7, 2016, 3 pages. Available at: https://www.jetbrains.com/help/resharper/2016.1/Coding_Assistance Code_Completion.html.

"IntelliSense for Object Literal Properties #6975", Retrieved on: Jul. 7, 2016, 2 pages, Available at: https://github.com/Microsoft/TypeScript/issues/6975.

* cited by examiner

CODE SNIPPET CONTENT RECOMMENDATION TO DEFINE AN OBJECT LITERAL

CROSS-REFERENCE TO RELATED APPLICATION(S)

This application claims the benefit of U.S. Provisional Application No. 62/364,844, filed Jul. 20, 2016 and entitled "Code Snippet Content Recommendation to Define an Object Literal," the entirety of which is incorporated by reference herein.

BACKGROUND

Developers often write code to call functions that accept objects with properties. Developers traditionally memorize information regarding such properties and/or manually search through reference materials to find the information. However, memorization may cause a substantial burden (e.g., temporal and/or mental burden) on a developer, and manual searching may consume substantial time and resources (e.g., processor, memory, network bandwidth) of a computing system that is used to facilitate development of the code. Accordingly, memorization and manual searching may be relatively inefficient techniques for identifying the information, which is used to develop the code.

In one example, when a developer develops code in an ECMAScript® (e.g., JavaScript®) programming language, the developer may configure the code to call functions, such as jQuery.ajax( ). Each function may be configured to accept a property bag that describes a variety of settings. Accordingly, the number of settings may be substantial, exacerbating the inefficiencies of the memorization and manual searching techniques mentioned above.

SUMMARY

Various approaches are described herein for, among other things, recommending content of a code snippet to define an object literal. A literal is a notation for representing a fixed value in code (e.g., source code). Example types of a fixed value include but are not limited to an integer, a floating-point number, a character, a string (e.g., of characters), a Boolean, an array, a record, and an object. An object literal is a literal that represents an object.

In a first example approach, a proxy object is provided to a function that is included in code. Information regarding one or more properties of an object literal is determined using global dynamic analysis based at least in part on a getter trap that is encountered during execution of the function with regard to the proxy object. Content of a code snippet is recommended to define the object literal based at least in part on the information. The content identifies the one or more properties of the object literal.

In a second example approach, information regarding one or more properties of an object literal is determined from one or more comments that are included in code. Content of a code snippet is recommended to define the object literal based at least in part on the information. The content identifies the one or more properties of the object literal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
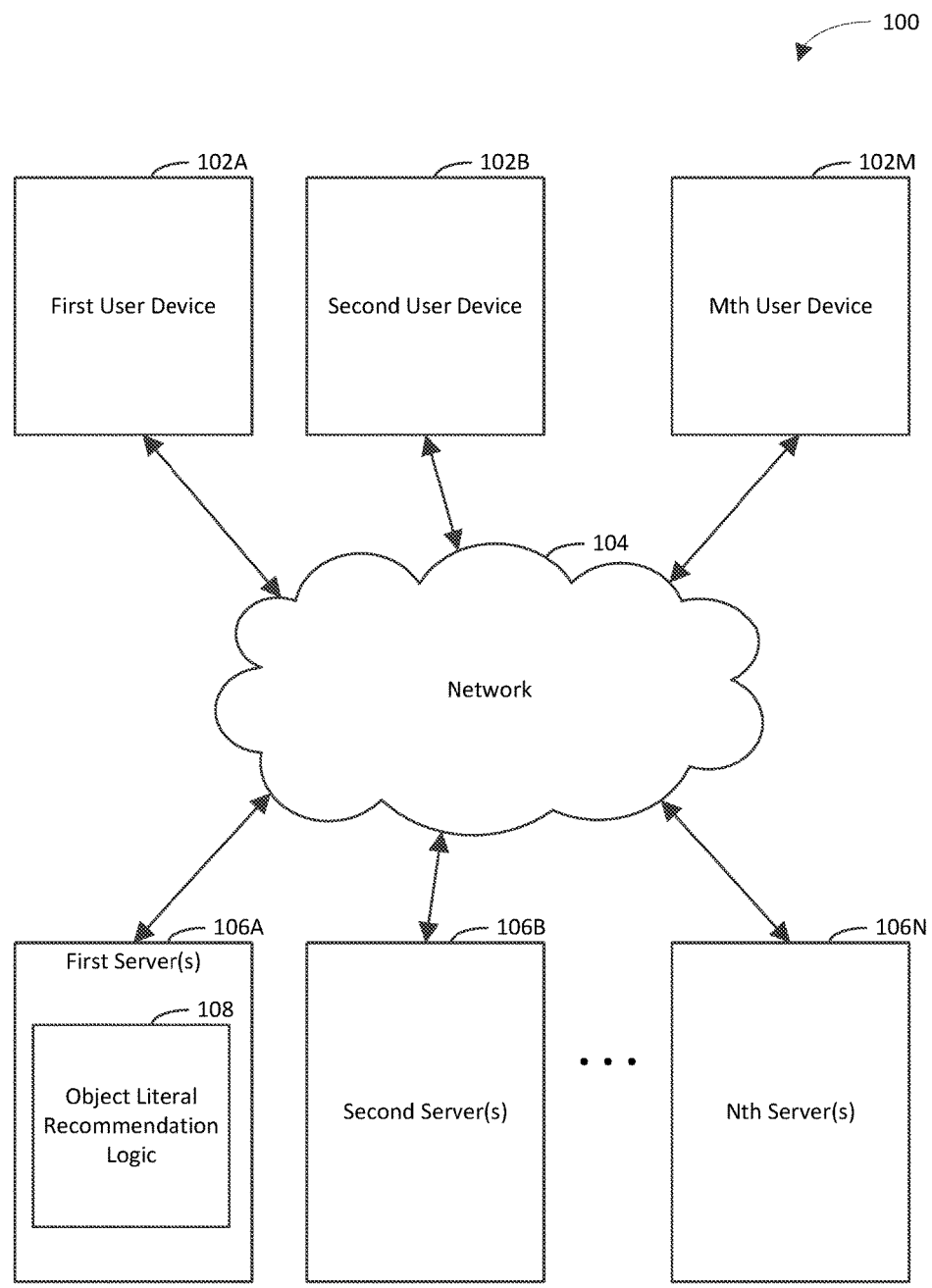
FIG. 1 is a block diagram of an example object literal recommendation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of recommending content of a code snippet to define an object literal. A literal is a notation for representing a fixed value in code (e.g., source code). Example types of a fixed value include but are not limited to an integer, a floating-point number, a character, a string (e.g., of characters), a Boolean, an array, a record, and an object. An object literal is a literal that represents an object.

Example techniques described herein have a variety of benefits as compared to conventional techniques for determining information to be used to develop code. For instance, the example techniques may simplify a process for defining an object literal (e.g., in a function call). The example techniques may be capable of providing an auto-complete and/or recommendation functionality with regard to an object literal. The example techniques may be capable of reducing a burden (e.g., temporal and/or mental burden) on a developer. The example techniques may increase user efficiency (e.g., by reducing a number of steps that a user takes and/or an amount of effort that the user expends to define an object literal). For instance, the example techniques may reduce (e.g., eliminate) a need for a user to memorize information regarding properties that are accepted by a function in code that is written by the user and/or to manually search through reference materials to find such information. The example techniques may be capable of reducing an amount of time and/or resources (e.g., processor, memory, network bandwidth) of a computing system that is used to facilitate development of the code. The example techniques may increase efficiency of a computing system that is used to facilitate development of the code.

FIG. 1 is a block diagram of an example object literal recommendation system 100 in accordance with an embodiment. Generally speaking, object literal recommendation system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, object literal recommendation system 100 recommends content of a code snippet to define an object literal. Detail regarding techniques for recommending content of a code snippet to define an object literal is provided in the following discussion.

As shown in FIG. 1, object literal recommendation system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of object literal recommendation system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include object literal recommendation logic 108 for illustrative purposes. Object literal recommendation logic 108 is configured to recommend content of a code snippet to define an object literal. Object literal recommendation logic 108 determines information regarding one or more properties of the object literal. Object literal recommendation logic 108 recommends the content of the code snippet to define the object literal based at least in part on the information. The content identifies the one or more properties of the object literal. In a first example implementation, object literal recommendation logic 108 determines (e.g., infers) the information from comment(s) that are included in code (e.g., a computer program). For instance, object literal recommendation logic 108 may analyze the comment(s) to determine the information. In a second example implementation, object literal recommendation logic 108 provides a proxy object to a function that is included in the code. In accordance with this implementation, object literal recommendation logic 108 determines the information regarding the one or more properties of the object literal using global dynamic analysis based at least in part on a getter trap that is encountered during execution of the function with regard to the proxy object.

It will be recognized that object literal recommendation logic 108 may include any of a variety of functionalities for building a computer program, including but not limited to source control, static code analysis, dynamic code analysis, compilation, linking, extraction, loading, etc.

Source control involves managing changes to a computer program. For instance, each time a change is made to the computer program, a revision number associated with the computer program may be incremented; a timestamp indicating a time at which the change was made may be stored; an indicator that specifies a person who made the change may be recorded, etc.

Static code analysis involves analyzing the computer program for information, including but not limited to comments, unit tests, duplication, complexity, potential bugs, and/or adherence to coding rules, without executing the computer program.

Dynamic code analysis involves determining information, such as the information mentioned above with respect to static code analysis, by executing the computer program.

Compilation involves transforming source code of the computer program into code of another language (e.g., executable code or intermediate code). For instance, the computer program may be compiled from a relatively higher-level programming language (e.g., C or C++) to a relatively lower-level language (e.g., assembly language or machine code). The source code may be compiled into object files, which are relocatable format machine code. The compiled computer program may be persisted to disk for subsequent processing.

Linking involves combining the code that results from compilation (e.g., object files) into a single executable computer program.

Extraction involves receiving (e.g., retrieving) information (e.g., data, computer program code, etc.) from a store for processing. For instance, precompiled headers may be extracted from a store during compilation of a computer program.

Loading involves storing information (e.g., executable code of a computer program) in main memory of one or more processing systems (e.g., any one or more of user systems 102A-102M and/or servers 106A-106N). For instance, such information may be copied from disk to the main memory. Loading may further involve performing preparatory operations to prepare executable code of the computer program for running. Examples of a preparatory operation include but are not limited to validating permissions, memory requirements, etc. associated with the computer program; copying command-line arguments on the stack; initializing registers, such as the stack pointer; jumping to the entry point of the computer program, etc.

It will be further recognized that object literal recommendation logic 108 may be (or may be included in) a developer tool, though the scope of the example embodiments is not limited in this respect. Example techniques for recommending content of a code snippet to define an object literal are discussed in greater detail below with reference to FIGS. 2-11.

Object literal recommendation logic 108 may be implemented in various ways to selectively load precompiled header(s) and/or portion(s) thereof, including being implemented in hardware, software, firmware, or any combination thereof. For example, object literal recommendation logic 108 may be implemented as computer program code configured to be executed in one or more processors. In another example, object literal recommendation logic 108 may be implemented as hardware logic/electrical circuitry. For instance, object literal recommendation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Object literal recommendation logic 108 is shown to be incorporated in first server(s) 106A for illustrative purposes and is not intended to be limiting. It will be recognized that object literal recommendation logic 108 (or any portion(s) thereof) may be incorporated in any one or more of the user systems 102A-102M. For example, client-side aspects of object literal recommendation logic 108 may be incorporated in one or more of the user systems 102A-102M, and server-side aspects of object literal recommendation logic 108 may be incorporated in first server(s) 106A. In another example, object literal recommendation logic 108 may be distributed among the user systems 102A-102M. In yet another example, object literal recommendation logic 108 may be incorporated in a single one of the user systems 102A-102M. In another example, object literal recommendation logic 108 may be distributed among the server(s) 106A-106N. In still another example, object literal recommendation logic 108 may be incorporated in a single one of the server(s) 106A-106N.

Figure 2:
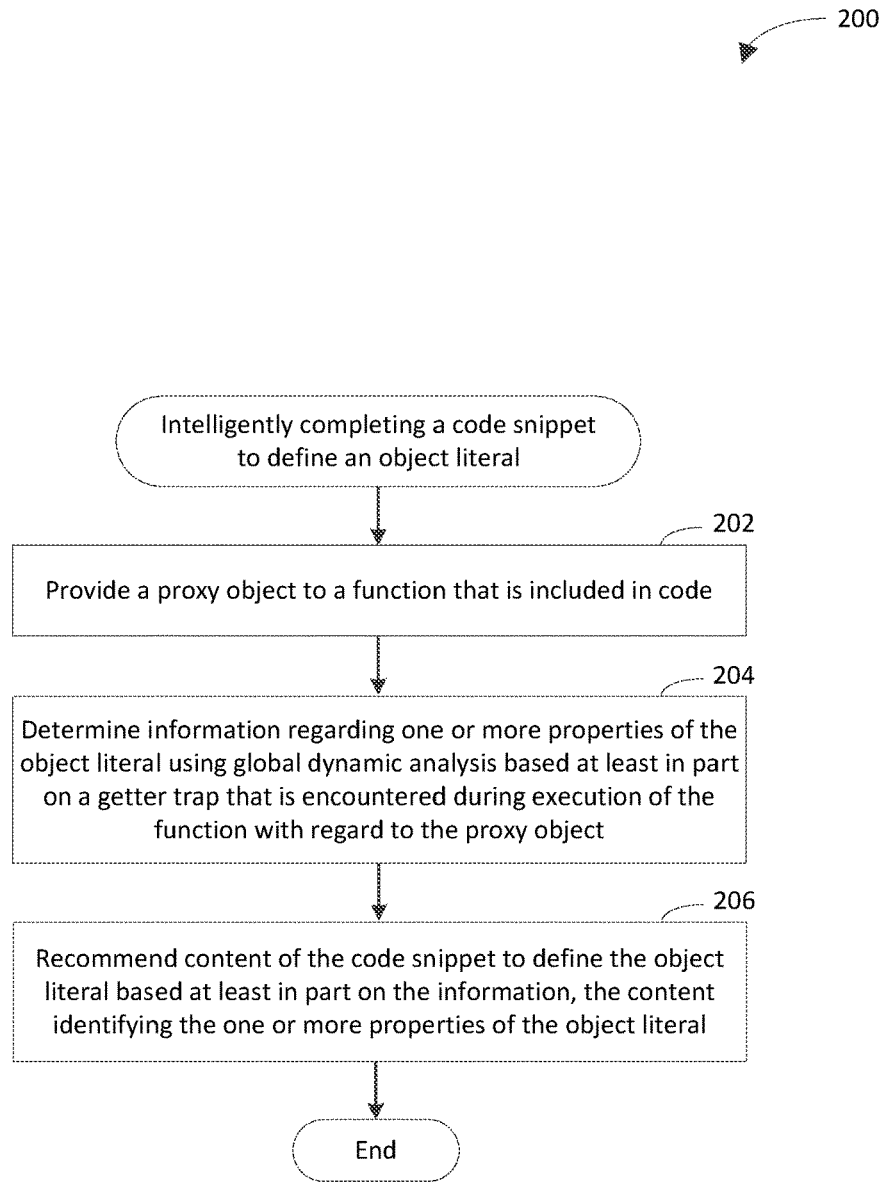
FIGS. 2 and 9 depict flowcharts of example methods for intelligently completing a code snippet to define an object literal in accordance with embodiments.
Figure 9:
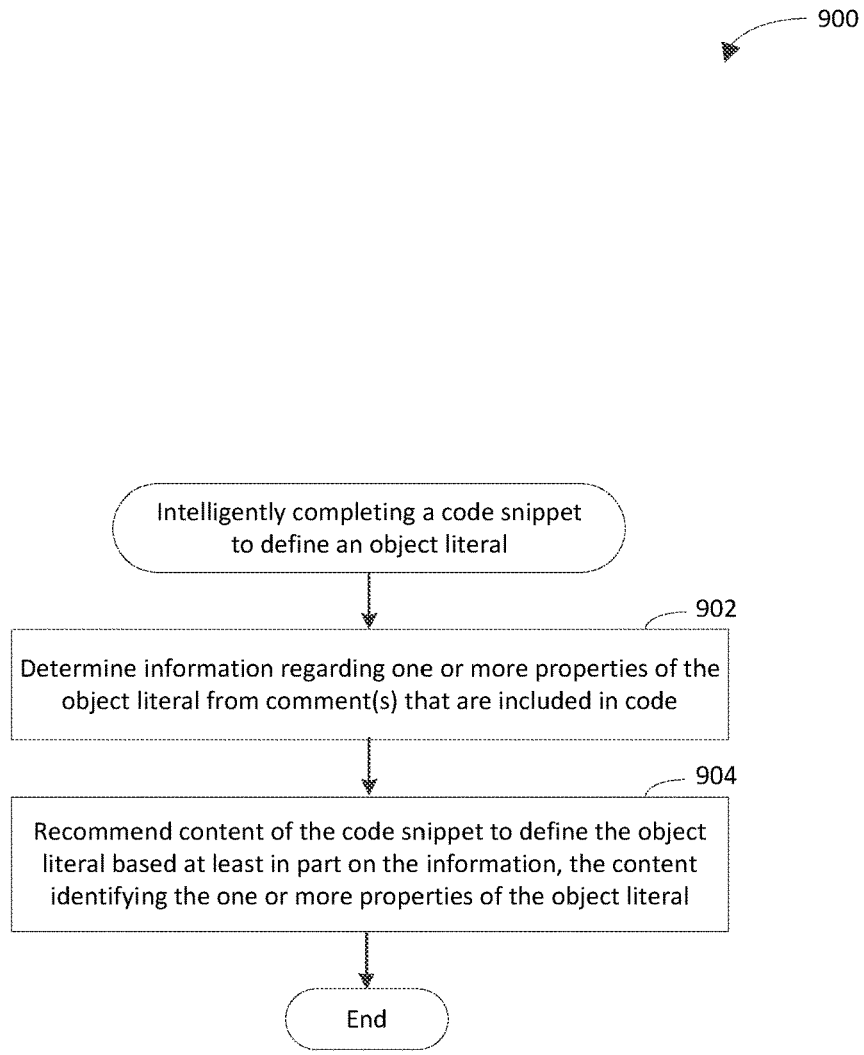

FIGS. 2 and 9 depict flowcharts 200 and 900 of example methods for intelligently completing a code snippet to define an object literal in accordance with embodiments. Flowcharts 200 and 900 may be performed by object literal recommendation logic 108 shown in FIG. 1, for example. For illustrative purposes, flowcharts 200 and 900 are described with respect to a computing system 1100 shown in FIG. 11. Computing system 1100 may include one or more of user systems 102A-102M, one or more of server(s) 106A-106N, or any combination thereof, though the scope of the example embodiments is not limited in this respect. Computing system 1100 includes object literal recommendation logic 1102 and a store 1104. Object literal recommendation logic 1102 includes provision logic 1106, determination logic 1108, recommendation logic 1110, and tooltip logic 1112. Further structural and operational embodiments will be apparent to persons skilled in the relevant art(s) based on the discussion regarding flowcharts 200 and 900.

As shown in FIG. 2, the method of flowchart 200 begins at step 202. In step 202, a proxy object is provided to a function that is included in code. In an example implementation, provision logic 1106 provides a proxy object 1124 to the function that is included in the code. For example, provision logic 1106 may retrieve the proxy object 1124 from store 1104. Store 1104 may be any suitable type of store. One type of store is a database. For instance, store 1104 may be a relational database, an entity-relationship database, an object database, an object relational database, an extensible markup language (XML) database, etc. In accordance with this example, store 1104 may store object(s) 1122, which include the proxy object 1124. In another example, provision logic 1106 may provide the proxy object 1124 to the function in response to receipt of an instruction that is initiated by a developer of the code. Provision logic 1106 may generate an execution notification 1116 in response to providing the proxy object 1124. The execution notification 1116 may specify that execution of the code has been initiated.

At step 204, information regarding one or more properties of the object literal is determined (e.g., inferred) using global dynamic analysis based at least in part on a getter trap that is encountered during execution of the function with regard to the proxy object. For instance, property access may be captured in non-trivial calling pattern(s). Examples of such calling patterns include but are not limited to nested function calls, dynamic function calls, and recursive function calls, which are discussed in further detail below. In an example implementation, determination logic 1108 determines the information regarding the one or more properties. For example, determination logic 1108 may determine the information in response to (e.g., based at least in part on) property information 1114. In accordance with this example, determination logic 1108 may receive the property information 1114 as a result of the global dynamic analysis. For instance, the property information 1114 may include the information regarding the one or more properties of the object literal. Determination logic 1108 may generate a recommendation instruction 1118 in response to determining the information regarding the one or more properties. For instance, the recommendation instruction 1118 may indicate the information and/or instruct recommendation logic 1110 to generate a recommendation that is based at least in part on the information.

In an example embodiment, determining the information at step 204 includes inferring one or more names of the one or more respective properties based at least in part on the information.

In another example embodiment, determining the information at step 204 includes inferring one or more syntaxes of the one or more respective properties based at least in part on the information.

In yet another example embodiment, determining the information at step 204 includes determining the information regarding the one or more properties of the object literal based at least in part on the getter trap that is encountered with regard to nested function call(s) that are included in the function. The nested function call(s) reference at least one of the one or more properties.

In still another example embodiment, determining the information at step 204 includes determining the information regarding the one or more properties of the object literal based at least in part on the getter trap that is encountered with regard to dynamic function call(s) that are included in the function. The dynamic function call(s) reference at least one of the one or more properties.

In yet another example embodiment, determining the information at step 204 includes determining the information regarding the one or more properties of the object literal based at least in part on the getter trap that is encountered with regard to recursive function call(s) that are included in the function. The recursive function call(s) reference at least one of the one or more properties.

In still another example embodiment, determining the information at step 204 includes determining the information regarding the one or more properties of the object literal based at least in part on the getter trap that is encountered with regard to definition(s) of one or more dynamic properties that are included in the function. The definition(s) of the one or more dynamic properties indicate at least one of the one or more properties.

At step 206, content of the code snippet to define the object literal is recommended based at least in part on the information. The content identifies the one or more properties of the object literal. For example, the content may indicate (e.g., include) a name and/or syntax of at least one (e.g., all) of the one or more properties. In another example, the content may be recommended to define the object literal in a call to the function based at least in part on the information. In an example implementation, recommendation logic 1110 recommends the content of the code snippet to define the object literal based at least in part on the information. For instance, recommendation logic 1110 may generate a recommendation 1126, which recommends the content.

In an example embodiment, providing the proxy object at step 202 includes providing the proxy object as an argument to the function. In accordance with this embodiment, determining the information at step 204 includes determining the information regarding the one or more properties that are requested with respect to the object literal (e.g., expected when making a call to the function) based at least in part on the getter trap that is encountered during the execution of the function with regard to the proxy object.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes determining that the object literal is to be a designated type selected from a plurality of types based at least in part on the information. In an example implementation, determination logic 1108 determines that the object literal is to be the designated type selected from the plurality of types based at least in part on the information. In accordance with this embodiment, recommending the content of the code snippet at step 206 includes indicating (e.g., specifying) that the object literal is to be the designated type. For example, the content may indicate that the object literal is to be the designated type. In accordance with this example, the content may include a function (e.g., constructor function) to define the designated type. For instance, recommendation logic 1110 may create the function, generate a name for the function, generate a definition of at least one of the one or more properties of the object literal, etc.

In another example embodiment, the method of flowchart 200 further includes providing a tooltip that includes information regarding the content. For example, the information may describe the content. In accordance with this example, the information may describe a type of at least one (e.g., all) of the one or more properties. The tooltip may be implemented as a graphical interface element configured as a text box, though the scope of the example embodiments is not limited in this respect. For instance, the text box may have a border that defines an outer perimeter of the text box. The information may be rendered as text in the text box.

In one example, the tooltip may be provided automatically in response to the content of the code snippet being recommended. In one aspect of this example, the tooltip may be displayed substantially simultaneously with the content that is recommended. In another aspect of this example, the tooltip may be displayed upon completion of a designated (e.g., predetermined) time delay. For instance, the content that is recommended may be displayed at a first time instance. The tooltip may be displayed at a second time instance that follows the first time instance. A difference between the first time instance and the second time instance may be a predetermined period of time. The predetermined period of time may be a fixed period of time. The predetermined period of time may be a calculated period of time that is calculated based on predetermined variable(s).

In another example, the tooltip may be provided based at least in part on a triggering action that is initiated by a user (e.g., a developer of the code). Accordingly, the tooltip may not be provided until the triggering action is initiated. In accordance with this example, the tooltip may be provided in response to the content being recommended and further in response to the triggering action being initiated. The triggering action may be selection of the content by the user. For instance, the user may select the content by hovering a cursor over the content (e.g., for at least a threshold period of time), clicking on the content, double-clicking on the content, providing a speech and/or gesture command that is configured to select the content, etc.

In an example implementation, tooltip logic 1112 provides a tooltip 1128 that includes information regarding the content. For example, recommendation logic 1110 may generate content information 1120 that includes the information regarding the content. In accordance with this example, tooltip logic 1112 may provide the tooltip 1128 in response to receipt of the content information 1120.

As mentioned above, FIG. 9 depicts a flowchart of another example method for intelligently completing a code snippet to define an object literal in accordance with an embodiment. As shown in FIG. 9, the method of flowchart 900 begins at step 902. In step 902, information regarding one or more properties of the object literal is determined from comment(s) that are included in code. For instance, the comment(s) may be analyzed to determine the information. In one example, the comment(s) may specify at least a portion (e.g., all) of the information. In another example, the comment(s) may include text from which at least a portion of the information is inferred (e.g., based on analysis of the comment(s)). In an example implementation, determination logic 1108 determines the information regarding the one or more properties of the object literal from the comment(s) that are included in the code. For instance, determination logic 1108 may determine the information in response to receipt of the property information 1114.

In an example embodiment, determining the information at step 902 includes inferring one or more names of the one or more respective properties based at least in part on the information. For instance, any of the one or more names may be specified by the information or inferred from the information.

In another example embodiment, determining the information at step 902 includes inferring one or more syntaxes of the one or more respective properties based at least in part on the information. For instance, any of the one or more syntaxes may be set forth in the information or inferred from the information.

At step 904, content of the code snippet is recommended to define the object literal based at least in part on the information. The content identifies the one or more properties of the object literal. In an example implementation, recommendation logic 1110 recommends the content of the code snippet to define the object literal based at least in part on the information.

In some example embodiments, one or more steps 902 and/or 904 of flowchart 900 may not be performed. Moreover, steps in addition to or in lieu of steps 902 and/or 904 may be performed. For instance, in the example embodiment, the method of flowchart 900 further includes determining that the object literal is to be a designated type selected from a plurality of types based at least in part on the information. In an example implementation, determination logic 1108 determines that the object literal is to be the designated type selected from the plurality of types based at least in part on the information. In accordance with this embodiment, recommending the content of the code snippet at step 904 includes indicating that the object literal is to be the designated type.

In another example embodiment, the method of flowchart 900 further includes providing a tooltip that includes information regarding the content. In an example implementation, tooltip logic 1112 provides a tooltip 1128 that includes information regarding the content. For example, recommendation logic 1110 may generate content information 1120 that includes the information regarding the content. In accordance with this example, tooltip logic 1112 may provide the tooltip 1128 in response to receipt of the content information 1120.

It will be recognized that computing system 1100 may not include one or more of object literal recommendation logic 1102, store 1104, provision logic 1106, determination logic 1108, recommendation logic 1110, and/or tooltip logic 1112. Furthermore, computing system 1100 may include components in addition to or in lieu of object literal recommendation logic 1102, store 1104, provision logic 1106, determination logic 1108, recommendation logic 1110, and/or tooltip logic 1112.

Any one or more of user systems 102A-102M, any one or more of servers 106A-106N, object literal recommendation logic 108, object literal recommendation logic 1102, store 1104, provision logic 1106, determination logic 1108, recommendation logic 1110, tooltip logic 1112, flowchart 200, and/or flowchart 900 may be implemented in hardware, software, firmware, or any combination thereof.

For example, any one or more of user systems 102A-102M, any one or more of servers 106A-106N, object literal recommendation logic 108, object literal recommendation logic 1102, store 1104, provision logic 1106, determination logic 1108, recommendation logic 1110, tooltip logic 1112, flowchart 200, and/or flowchart 900 may be implemented, at least in part, as computer program code configured to be executed in one or more processors.

In another example, any one or more of user systems 102A-102M, any one or more of servers 106A-106N, object literal recommendation logic 108, object literal recommendation logic 1102, store 1104, provision logic 1106, determination logic 1108, recommendation logic 1110, tooltip logic 1112, flowchart 200, and/or flowchart 900 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

Example embodiments may be capable of providing convenience for a developer when the developer develops code in a language in which an object that conforms to a specified shape (such as a property bag in the JavaScript® programming language) is to be constructed. The example embodiments are applicable to any of a variety of programming languages, including but not limited to JavaScript®, Python™, etc. For instance, the example embodiments may be applicable to dynamic languages (e.g., JavaScript®) that have no pre-defined strong type. The example embodiments may facilitate defining object literal(s) when application programming interfaces (APIs) are designed with an expectation that a developer will create an object of a specified shape.

For example, jQuery.ajax( ), a function from a popular JavaScript library named jQuery, accepts a property bag when called. The property bag includes properties such as accepts, async, beforeSend, etc.

With the growing use of dynamic languages such as JavaScript®, APIs are taking more and more properties. Most APIs ignore a property that is not set and ignore a property that is not specified. The increasing number of properties may frustrate a developer's efforts to (a) remember what properties are required, (b) remember how the names of the properties are spelled, and/or (c) diagnose issues regarding misspelled properties.

Example embodiments may implement object literal intelligent computing utilizing a feature of an integrated development environment (IDE), such as the Intellisense feature of Visual Studio® (developed and distributed by Microsoft Corporation), though the scope of the example embodiments is not limited in this respect. For example, the object literal intelligent computing may be implemented on a same computer on which the IDE is installed. In accordance with this example, the object literal intelligent computing and the IDE may be implemented within the same process. In another example, object literal Intellisense may complement the existing Intellisense infrastructure by providing completion of a code snippet at the point when a user attempts to create (e.g., initiates creation of) an object literal for usage that the editor understands. Some example embodiments are described herein with reference to the Intellisense feature of Visual Studio® for illustrative purposes and are not intended to be limiting. It will be recognized that the example embodiments are applicable to any suitable feature of any suitable IDE. Moreover, the example embodiments are applicable in environments that do not include an IDE.

FIGS. 3-8 and 10 depict portions of code 302, 402, 502, 602, 702, 802, and 1002 in accordance with embodiments. FIGS. 3-8 and 10 further depict code snippet content recommendations 304, 404, 504, 604, 704, 804, and 1004 to define object literals. The code snippet content recommendations 304, 404, 504, 604, 704, and 804 shown in FIGS. 3-8 may be provided in response to performing global dynamic analysis of the code 302, 402, 502, 602, 702, and 802 shown therein. The code snippet content recommendation 1002 shown in FIG. 10 may be provided based at least in part on comment(s) that are included in the code 1004 shown therein. As described in further detail below, each of the code snippet content recommendations 304, 404, 504, 604, 704, 804, and 1004 depicted in FIGS. 3-8 and 10 recommends content that identifies one or more properties for defining an object literal in a code snippet, rather than the developer having to remember which properties are expected by a function that is called using the code snippet and how the names of the properties are spelled. The properties shown in FIGS. 3-8 and 10 are listed in drop-down menus for illustrative purposes and are not intended to be limiting. It will be recognized that the properties may be provided in any suitable manner for selection by the developer or to automatically complete the code snippets for the developer. FIGS. 3-8 and 10 further depict tooltips 306, 406, 506, 606, 706, 806, and 1006, which are described in greater detail below.

A developer may not know what properties will be needed in an object literal, especially when external documentation is unavailable in machine consumable format. The properties may be determined in any of a variety of ways in accordance with the techniques described herein. For example, with regard to FIGS. 3-8, when a developer makes a function call, a global dynamic analysis may be performed on the function to obtain the set of properties that is expected by the function. In accordance with this example, a heuristic solution (e.g., based on JavaScriptProxy) may be utilized to determine the properties. In further accordance with this example, a proxy object may be passed into a function that is to be called, and the proxy object may be executed. For instance, the proxy object may be used to extract information regarding the properties from the code that includes the function. When the proxy object is passed into the function, the code may encounter a getter trap. The getter trap may be used to capture information indicating that the properties are read, and then the developer may be notified that those properties are needed.

Figure 3:
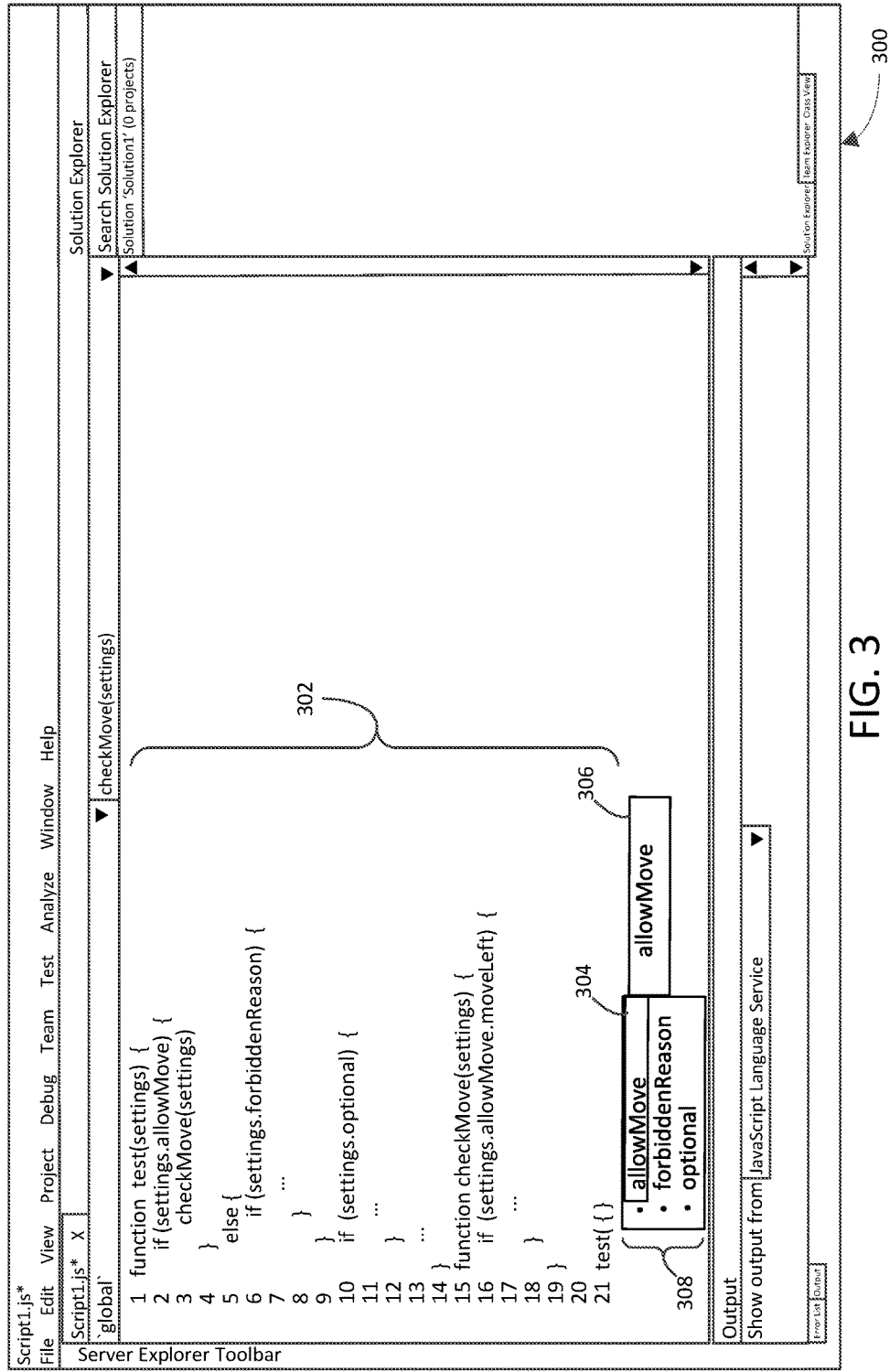
FIGS. 3-8 and 10 depict portions of code in accordance with embodiments.

FIG. 3 illustrates an example of a recommendation 304 of content 308 that identifies multiple properties, which are defined in a function, to define an object literal. As shown in FIG. 3, the definition of the function "test" in lines 1-14 of the code 302 defines the property "allowMove" at line 2 of the code 302, defines the property "forbiddenReason" at line 6 of the code 302, and defines the property "optional" at line 10 of the code 302. The example embodiments may analyze the code 302 to discover the aforementioned properties. For thoroughness, it is noted that the definition of the function "test" includes a nested function call to "checkMove" at line 3 of the code 302. The function call is performed at runtime (i.e., when the code 302 is executed).

As shown in line 21 of the code 302, when the user (e.g., developer) begins to write a call to the function "test", the user types "test ({" and then starts to define the object literal for "settings". A recommendation 304 of content 308 to be incorporated into the code snippet in line 21 of the code 302 may be provided (e.g., displayed) when the user starts to type the open curly brace in the string "test ({", for example.

It can be said that the code 302 indicates the properties that are expected by the function "test". For instance, the code 302 indicates that the properties "allowMove", "forbiddenReason", and "optional" are expected. Accordingly, the recommendation 304 specifies the content 308 to identify the properties "allowMove", "forbiddenReason", and "optional" in this example. The recommendation 304 is included in a drop-down menu for purposes of illustration and is not intended to be limiting. It will be recognized that the recommendation 304 may be provided in any suitable format. The property "allowMove" is shown to be highlighted in the recommendation 304 for illustrative purposes. Tooltip 306 is also provided. The tooltip 306 includes information regarding the property "allowMove" in response to the property "allowMove" being highlighted in the recommendation 304.

In the embodiment of FIG. 3, when the user writes "test({", the drop-down menu is displayed, and the close curly brace "}" is displayed. If the user selects (e.g., clicks on) "allowMove" in the recommendation 304, the property "allowMove" is inserted between the curly braces in line 21 of the code 302. The object literal is the content that is inserted between the curly braces. Accordingly, if the user selects "allowMove" in the recommendation 304, then the object literal is defined to include (e.g., to be) the property "allowMove". If "allowMove" is the only content between the curly braces, it may be said that the property "allowMove" becomes the object literal. In this embodiment, the function "test" has a single argument. Thus, selection of "allowMove" causes "allowMove" to become the property name of the object literal.

The body of the function definition can have nested calls, etc., which can influence the shape of the options that the user sees when the user types "test ({" to call the function "test". When a function expects an object that has one or more properties (e.g., "allowMove", etc.), the example embodiments may determine the one or more properties that the function expects by looking at the code 302 that is within the definition of the function. The function may include nested function calls, dynamic function calls, recursive function calls, definitions of one or more dynamic properties, etc., which are discussed in further detail below.

It can be seen in FIG. 3 that the execution of the code 302 will move in either the "allowMove" branch of the first if statement or the other branch of the first if statement, but not both. In an example implementation, the getter trap may be configured to return TRUE. Configuring the getter trap to return TRUE may maximize the code 302 to be executed and therefore may result in a greater number of properties being discovered and/or may increase a probability that all properties are discovered.

Figure 4:
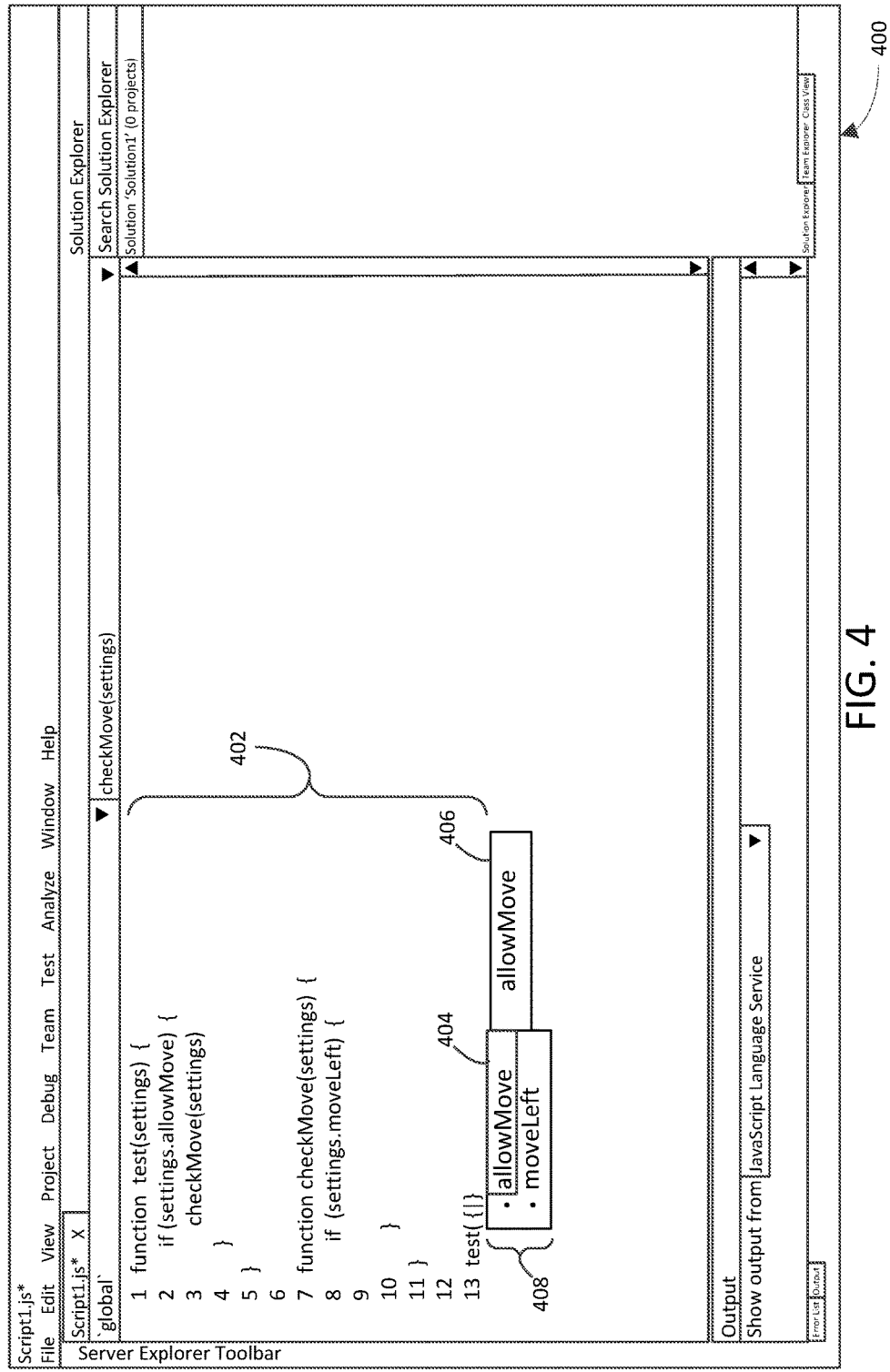

FIG. 4 illustrates an example of a nested function that defines a property that is included among content 408, which is recommended to define an object literal. The code 402 defines the function "test" at lines 1-5 of the code 402 and defines the function "checkMove" at lines 7-11 of the code 402. The function "test" calls the function "checkMove" at line 3 of the code 402. As depicted in line 13 of the code 402, the user begins writing a call to the function "test". Notice that the content 408 in the recommendation 404 includes a list of properties. The list of properties includes the entries "allowMove" and "moveLeft". The nesting of the function call to "checkMove" in the definition of the function "test" may be analyzed to discover the property "moveLeft" in the definition of the function "checkMove". It should be noted that nesting of function calls can include any suitable number of levels of nesting. The various levels of the nesting may be analyzed to determine the properties referenced (e.g., defined) therein.

Rather than having to search through the code 402 to figure out the available properties, the recommendation 404 is provided to the user. The content 408 may indicate all of the possible properties that may be identified between the curly braces in the code snippet depicted in line 13 of the code 402, though the scope of the example embodiments is not limited in this respect.

The content 408 indicates the objects that the call to the function "test" will take as an argument. When the user calls the function "test", the user uses the curly braces to define at least a first argument (e.g., the properties that the argument needs to take). If the argument is an object, the recommendation 404 may be provided to enable a user to select one or more of the properties identified by the content 408 to define the object literal for the object, or the recommendation 404 may be provided in accordance with an auto-completion operation to automatically define the object literal for the object (e.g., without a need for the user to select the one or more properties). For instance, one or more of the properties that are identified by the content 408 may be automatically inserted between the curly braces to automatically complete the code snippet in line 13 of the code 402. The content 408 identifies the properties of the argument that are expected when a call is made to the function "test".

Figure 5:
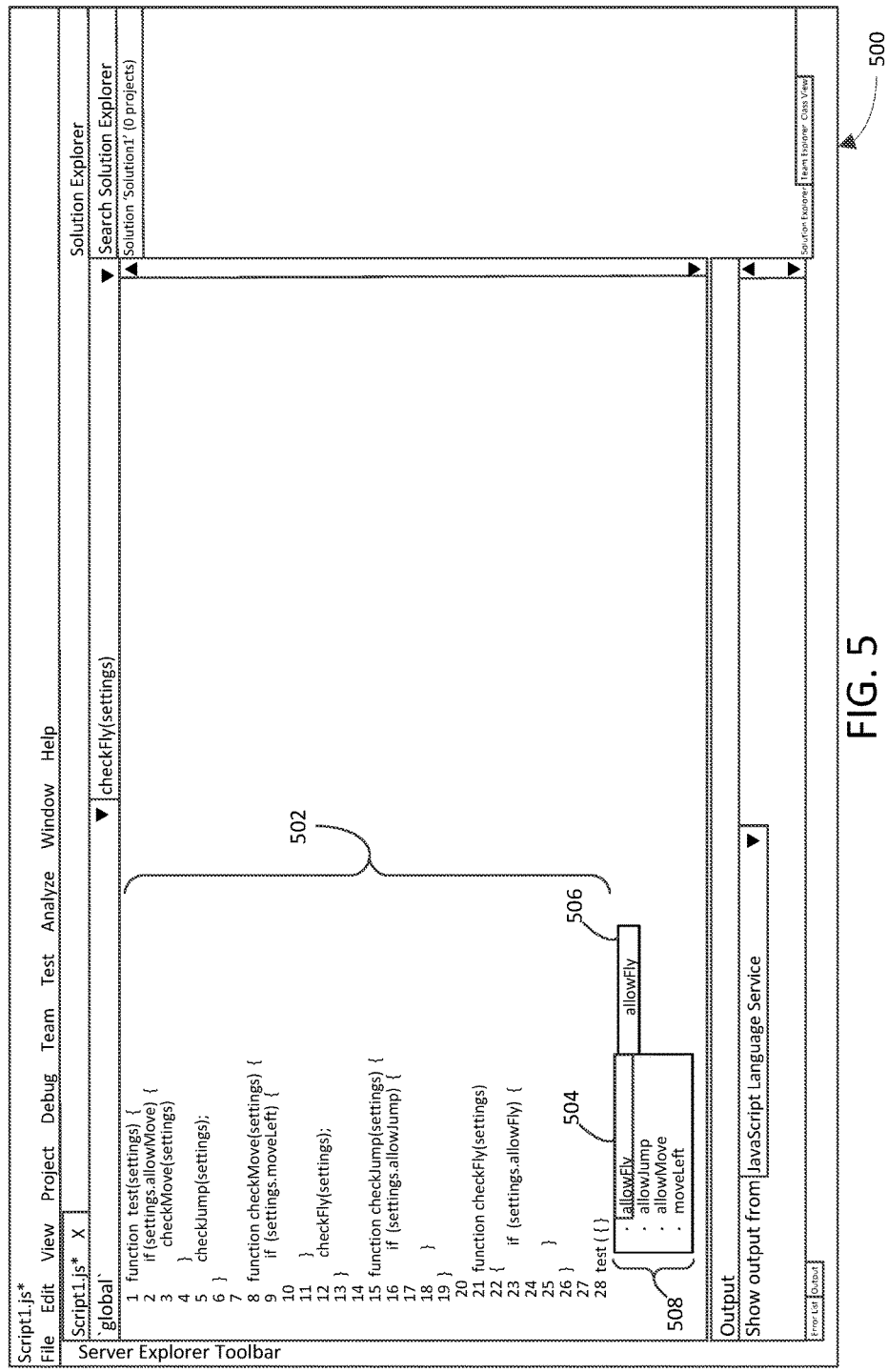

FIG. 5 illustrates multi-level nesting of functions that define properties that are included among content 508, which is recommended for defining an object literal. In the embodiment of FIG. 5, a call to the function "test" is being written in line 28 of the code 502. The first item in the parentheses is the first argument, which is an object literal that will become the argument "settings" in line 1 of the code 502. It is desirable for "allowMove" to be listed as an option in the recommendation 504 for the object literal property, because "allowMove" is accessed at line 2 of the code 502.

It is also desirable for "moveLeft" to be listed as an option because "moveLeft" is accessed at line 9 of the code 502, and the function "checkMove", which defines "moveLeft", is called at line 3 of the code 502.

Line 28 of the code 502 establishes which of these object literals is going to be inserted into the function "test" at line 1 of the code 502 based on (e.g., based at least in part on) which of the object literal properties in the recommendation 504 is selected by the user.

Analyzing the rest of the code 502 reveals that if settings=allowMove, then "checkMove" is going to be called at line 3 of the code 502, then "checkJump" is going to be called at line 5 of the code 502, and so on.

Code may be executed by providing a proxy object to the code (e.g., in order to perform global dynamic analysis). Heuristics may be used in the analysis of the code. All if statements in the code may be set to true, though the scope of the example embodiments is not limited in this respect. If a function includes if statements, substantial resources and time may be consumed to analyze all branches associated with the if statements. Thus, the if statements in the function may be set to true, and a determination may be made as to which properties are expected by the function. If a property is defined in an else branch, the property may not be discovered if all if statements are set to true.

With regard to FIG. 5, "settings" is an argument of the function "test", which is defined at lines 1-6 of the code 502. "Settings" may be implemented as a proxy object that is provided to the function "test". A getter trap may be incorporated into the proxy object. The getter trap may be used to analyze the function "test". For instance, the getter trap may wait for a request to access a property on "settings". When the getter trap receives a request to access a property on "settings", the getter trap records (e.g., traps) information regarding the property. In an example embodiment, a JavaScript® proxy object is passed as an argument to the function "test". In accordance with this embodiment, execution of the JavaScript® proxy object may enable identification of the properties that are requested with regard to the argument.

It can be said that the getter trap follows the function "test" to determine properties that are expected by the function when the function is called. For instance, the getter trap may check whether "settings" is set to "allowMove" (at line 2 of the code 502). The getter trap records that the property "allowMove" has been requested. Assuming that all if statements are set to true in this example, the function "checkMove" is called at line 3 of the code 502. The getter trap is used to analyze the function "checkMove", which is defined at lines 8-13 of the code 502. The getter trap records that the property "moveLeft" is requested (at line 9 of the code 502). The getter trap encounters "checkFly" at line 12 of the code 502 during execution of the function "checkMove". The getter trap is used to analyze the function "checkFly", which is defined at lines 21-26 of the code 502. The getter trap records that the property "allowFly" is requested (at line 23 of the code 502). In this manner, the getter trap keeps track of the properties that are expected by the function "test" (including the properties that are expected by the functions that are called by the function "test") as the getter trap moves through the code 502.

Figure 6:
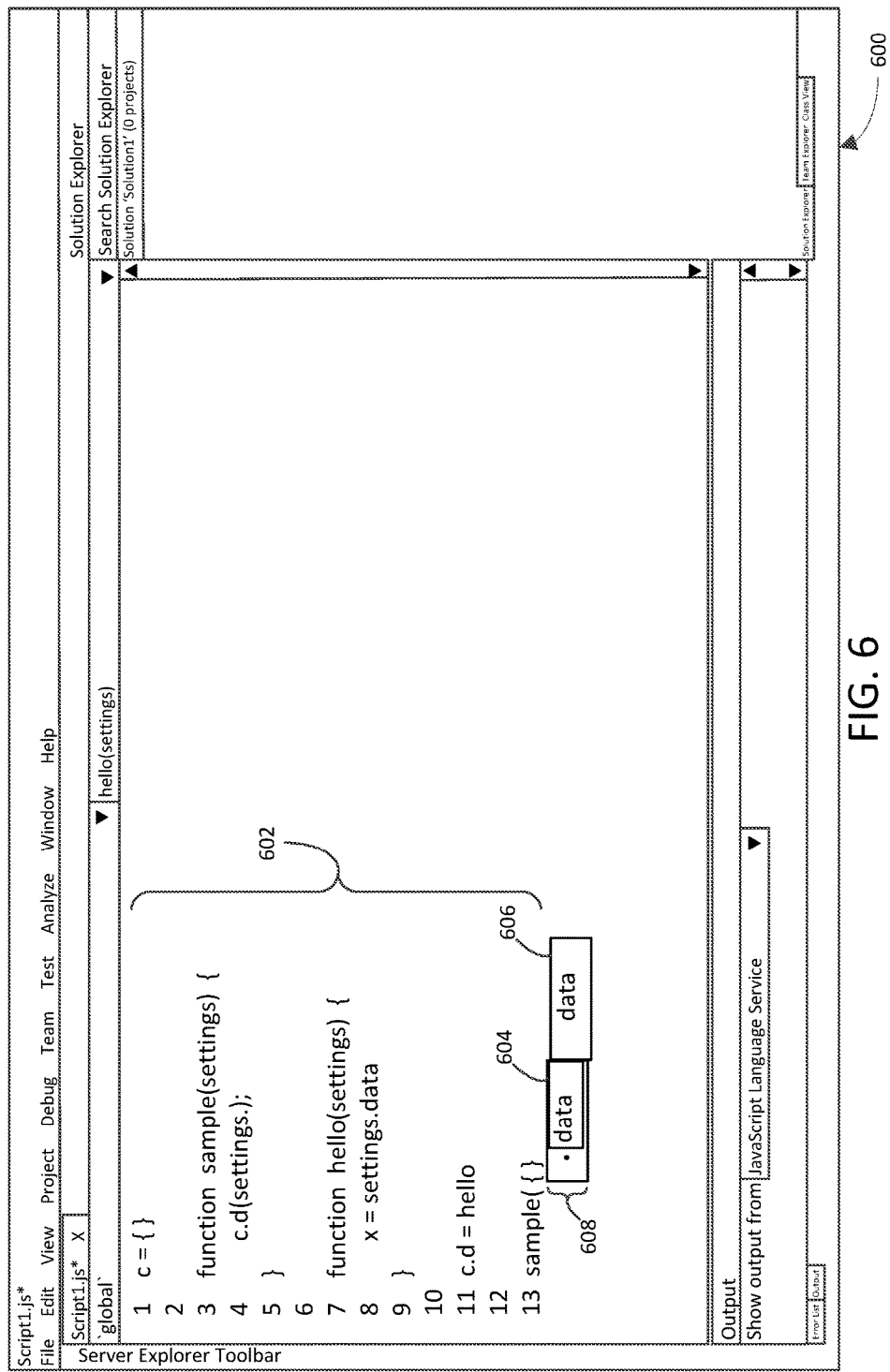

FIG. 6 illustrates a dynamic function call that calls a function that defines a property, which is identified by content 608 that is recommended to define an object literal. At line 13 of the code 602, a user attempts to make a call to the function "sample". In the function "sample", an item labeled "c.d" is called. It is unclear what "c.d" is if only line 11 of the code 602 (where "c.d" is defined) is reviewed. The definition of the function "hello" at lines 7-9 of the code 602 may be analyzed to determine (e.g., discover) the property "data" therein. The call to "c.d" is referred to as a "dynamic call" because a value of "c.d" is changeable. For instance, in another portion of the code 602 (or in other code that is different from the code 602), "c.d" may be set to a different value (i.e., other than "hello"). In line 11 of the code 602, "c.d" is defined to be the function "hello". The definition of the function "hello" is available at runtime, which enables the example embodiments to determine the property "data" therein (e.g., using global dynamic analysis).

Figure 7:
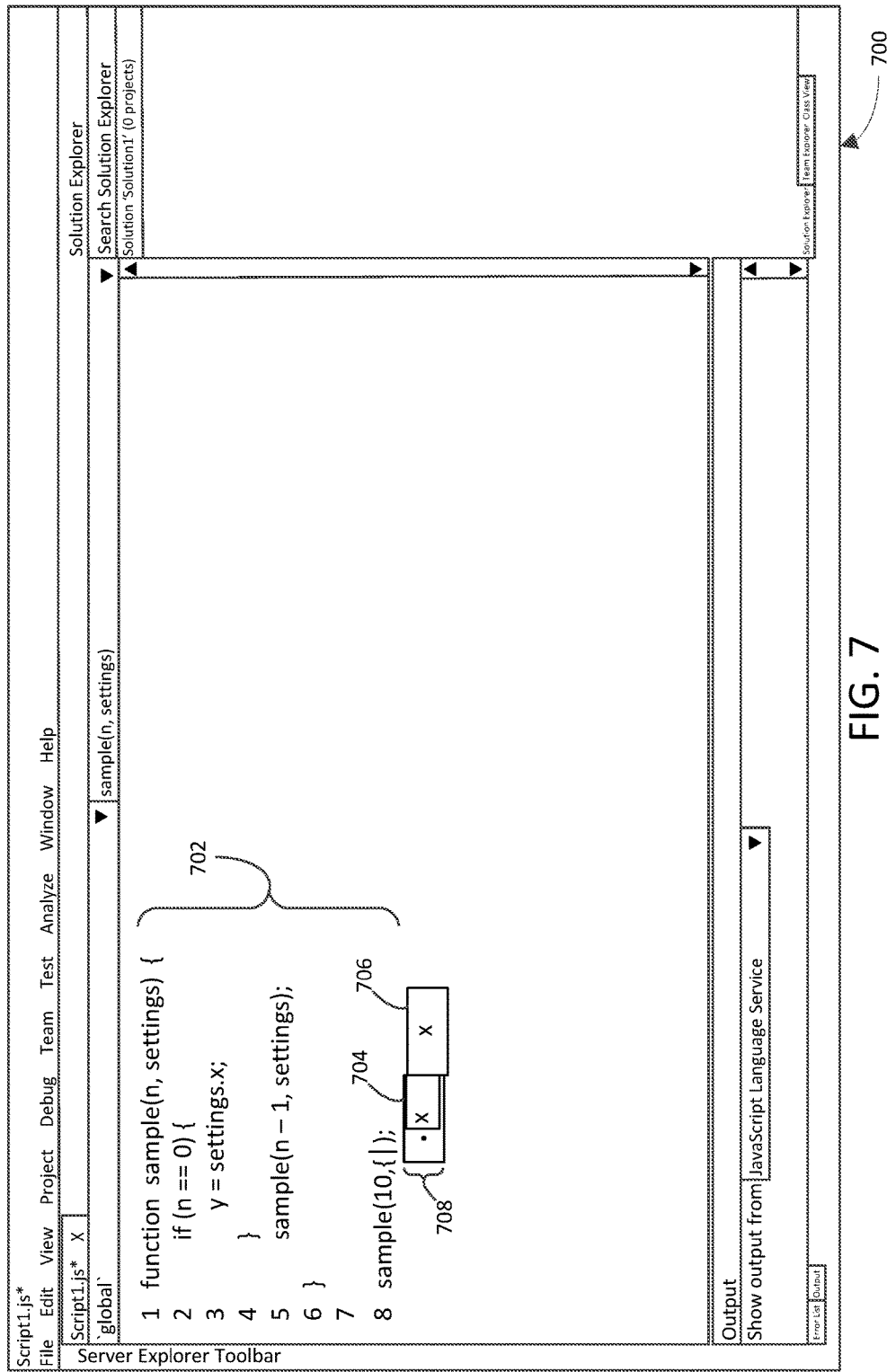

FIG. 7 illustrates a recursive function call that recursively calls to a function that defines a property, which is identified by content 708 that is recommended to define an object literal. In FIG. 7, a user begins writing a call to a function named "sample" at line 8 of the code 702. At line 5 of the code 702, the function "sample" calls itself. In the first call to the function "sample", n=10. The variable "n" is decremented by one with each iteration of the function. The variable "n" will eventually equal zero at which time the property "x" is accessed (at line 3 of the code 702). The definition of the recursive function "sample" is analyzed to determine (e.g., discover) the property "x" therein. The recommendation 704 therefore recommends the content 708 to identify the property "x" to be placed between the curly braces in the call to the function "sample" at line 8 of the code 702. The user who is writing the code 702 may select the property "x" in the recommendation 704 to cause the property "x" to be inserted between the curly braces, thereby causing the property "x" to become the object literal. The code 702 may include an arbitrary amount of nesting, though the scope of the example embodiments is not limited in this respect.

Figure 8:
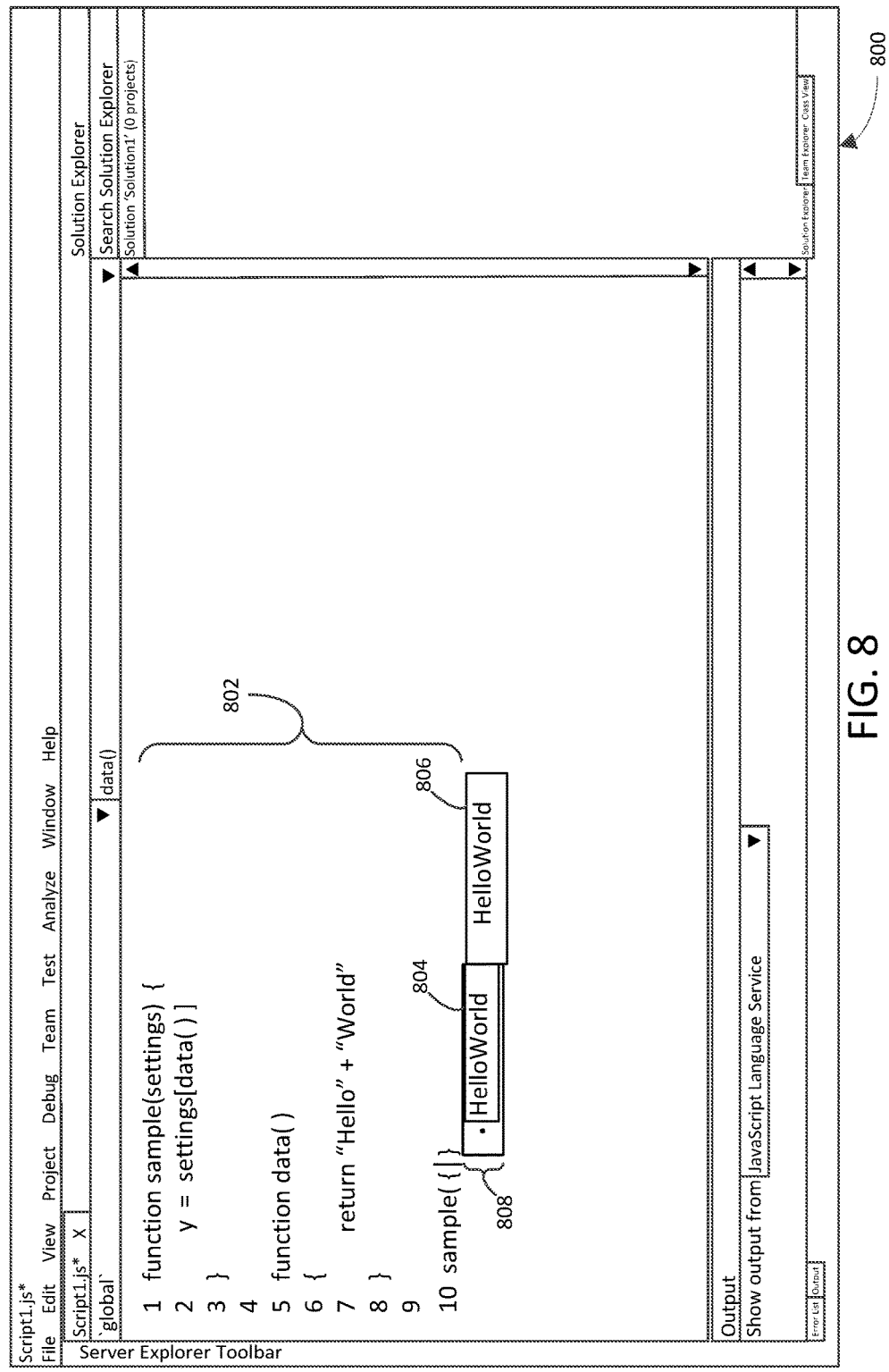

A property that is to be accessed by a function may be dynamic. FIG. 8 illustrates a recommendation of content 808 that identifies a dynamic property to define an object literal. In line 10 of the code 802, a user begins to write a call to a function "sample". In line 2 of the code 802, the function "sample" accesses a property of the object "settings". The property has a name that is computed by the function "data", which is defined at lines 5-8 of the code 802. The example embodiments may be capable of computing the function "data" and determining that the value of the function "data" is "HelloWorld" (e.g., using global dynamic analysis). The example embodiments may be further capable of determining that the name of the property is "HelloWorld" based at least in part on the name of the property being computed by the function "data" and further based at least in part on the value of the function "data" being "HelloWorld".

In the examples mentioned above, it may not be possible to determine content to define an object literal in a call to a function by analyzing the function statically and/or locally. For instance, the properties of the object literal may not be discoverable merely by looking at the function (e.g., the definition of the function). Referring back to FIG. 6, if only the definition of the function "sample" at lines 3-5 of the code 602 were considered, it may not be possible to determine that the property "data" is a potential property to be inserted between the curly braces in the call to the function "sample" that is shown in line 13 of the code 602. Accordingly, embodiments described herein may use global dynamic analysis (e.g., rather than local and/or static analysis) to determine information regarding properties of an object literal.

Following is a brief discussion of the terms "local analysis", "global analysis", "static analysis", and "dynamic analysis". It will be recognized that attributes of "local analysis" and "static analysis" may be combined to result in "local static analysis"; attributes of "global analysis" and "dynamic analysis" may be combined to result in "global dynamic analysis", and so on.

Local analysis of a function analyzes the definition of the function and not information that is external to the definition of the function. Accordingly, it may be necessary for a property to be defined in a function if local analysis is used to determine information regarding the property. For instance, local static analysis of the function "sample" in the embodiment of FIG. 6 would be limited to lines 3-5 of the code 602, which define the function "sample". As shown in FIG. 6, the property "data" is not referenced in lines 3-5 of the code 602. Thus, local static analysis of the function "sample" would be incapable of determining that the property "data" is available to define the object literal for the object "settings" in the call to the function "sample" at line 13 of the code 602. By contrast, local static analysis of the function "test" in the embodiment of FIG. 5 is capable of determining that the property "allowMove" is available to define the object literal for the object "settings" in the call to the function "test" at line 28 of the code 502 because the property "allowMove" is defined in the function "test" (at line 2 of the code 502).

By using global analysis, a property need not necessarily be defined in a function in order for information regarding the property to be determined. For instance, the property may be defined in the function, in another function (e.g., that is included in a first file that is different from a second file that includes the function), on the Internet (e.g., where the property may be stored as a script), etc. In the embodiment of FIG. 6, global dynamic analysis enables a determination that the property "data" is available to define the object literal for the object "settings" in the call to the function "sample" at line 13 of the code 602.

Static analysis of code does not consider how the code behaves during execution of the code (e.g., in order to determine a property of an object literal in a function call in the code). For instance, static analysis of the code may be performed without executing the code.

Dynamic analysis of code considers how the code behaves during execution of the code (e.g., in order to determine a property of an object literal in a function call in the code). For instance, dynamic analysis of the code may require execution of the code. In the embodiment of FIG. 6, "data" may be identified as a possible property of the object literal for the object "settings" by executing the code 602 during dynamic analysis of the code 602.

Figure 10:
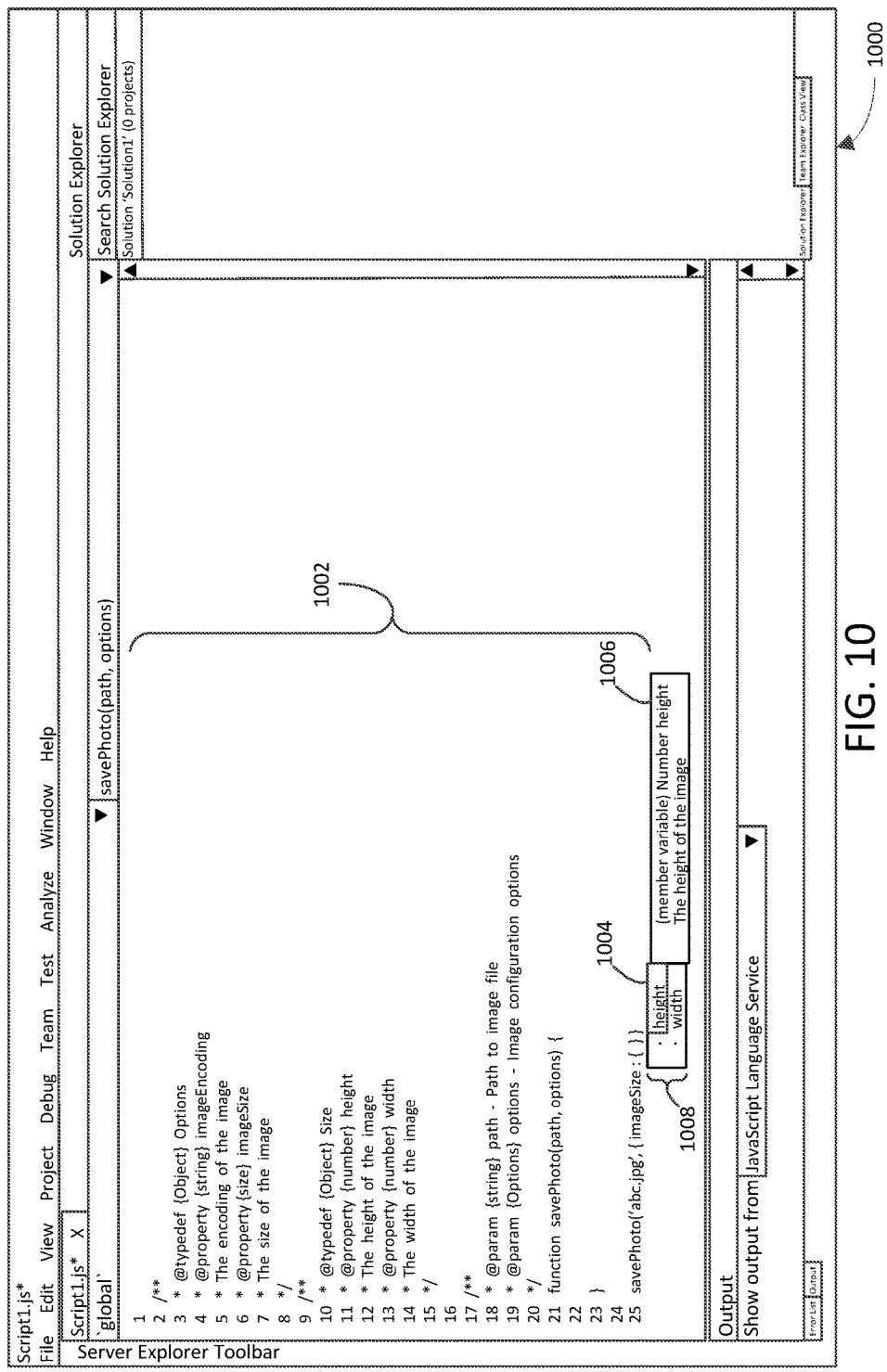
Figure 11:
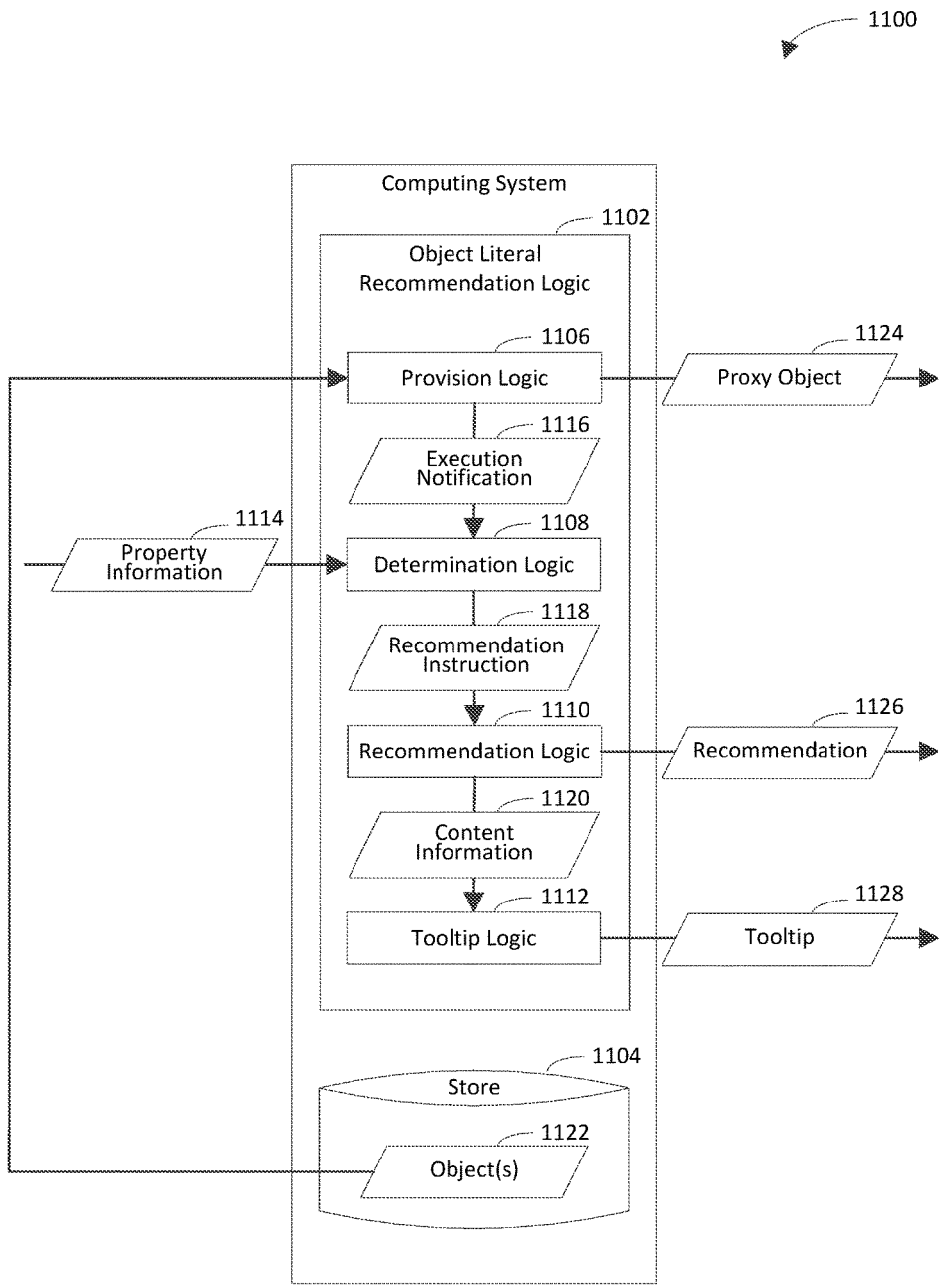
FIG. 11 is a block diagram of an example computing system in accordance with an embodiment.

The example embodiments may be capable of repurposing comments in code to provide object literal intelligent computing. For instance, the example embodiments may leverage existing descriptions of objects in the comments to determine information regarding properties of an object literal. FIG. 10 illustrates a recommendation of content 1008, identifying properties that are derived (e.g., inferred) from comments in code, to define an object literal. The properties may be inferred from the comments without an analysis occurring. For instance, global dynamic analysis and/or local static analysis may not be used to determine information regarding the properties to facilitate defining the object literal. Rather, the comments may be used as information to drive object literal intelligent computing.

The code 1002 includes three comment blocks for illustrative purposes. The first comments block is at lines 2-8 of the code 1002. The second comments block is at lines 9-15 of the code 1002. The third comments block is at lines 17-20 of the code 1002. In the third comments block, two parameters are identified at respective lines 18 and 19 of the code 1002. The first parameter is "path", and the second parameter is "options". The first comments block defines the parameter "options". The parameter "options" has two properties: "imageEncoding", which is indicated at line 4 of the code 1002, and "imageSize", which is indicated at line 6 of the code 1002. In the second comments block, line 11 of the code 1002 indicates that an object "Size" has a property "height", and line 13 of the code 1002 indicates that the object "Size" has a property "width".

Example embodiments are capable of reviewing the comments to determine that the properties "height" and "width" are available for defining the object literal at line 25 of the code 1002. For instance, the example embodiments may identify the term "imageSize" in line 25 of the code 1002. The example embodiments may determine that "imageSize" is a "size" by reviewing line 6 of the code 1002 in the first comments block. The example embodiments may determine that a "size" has a height and a width by reviewing the statements in the second comments block. The example embodiments may then recommend "height" and "width" as possible properties of "imageSize" for defining the object literal at line 25 of the code 1002.

A tooltip 1006 is displayed next to the recommendation 1004. The tooltip 1006 provides information regarding the property "height". For instance, the tooltip 1006 may explain what the property "height" is. Accordingly, the example embodiments may be capable of informing the user about the existence of a property, what type the property should be, attributes of the type, etc.

IV. Yet Further Discussion of Some Example Embodiments

In a first example method of intelligently completing a code snippet to define an object literal, a proxy object is provided to a function that is included in code. Information regarding one or more properties of the object literal is determined using global dynamic analysis based at least in part on a getter trap that is encountered during execution of the function with regard to the proxy object. Content of the code snippet is recommended to define the object literal based at least in part on the information. The content identifies the one or more properties of the object literal.

In a first aspect of the first example method, providing the proxy object comprises providing the proxy object as an argument to the function. In accordance with the first aspect, determining the information comprises determining the information regarding the one or more properties that are requested with respect to the object literal based at least in part on the getter trap that is encountered during the execution of the function with regard to the proxy object.

In a second aspect of the first example method, determining the information comprises inferring one or more names of the one or more respective properties based at least in part on the information. The second aspect of the first example method may be implemented in combination with the first aspect of the first example method, though the example embodiments are not limited in this respect.

In a third aspect of the first example method, determining the information comprises inferring one or more syntaxes of the one or more respective properties based at least in part on the information. The third aspect of the first example method may be implemented in combination with the first and/or second aspect of the first example method, though the example embodiments are not limited in this respect.

In a fourth aspect of the first example method, determining the information comprises determining the information regarding the one or more properties of the object literal based at least in part on the getter trap that is encountered with regard to one or more nested function calls that are included in the function, the one or more nested function calls referencing at least one of the one or more properties. The fourth aspect of the first example method may be implemented in combination with the first, second, and/or third aspect of the first example method, though the example embodiments are not limited in this respect.

In a fifth aspect of the first example method, determining the information comprises determining the information regarding the one or more properties of the object literal based at least in part on the getter trap that is encountered with regard to one or more dynamic function calls that are included in the function, the one or more dynamic function calls referencing at least one of the one or more properties. The fifth aspect of the first example method may be implemented in combination with the first, second, third, and/or fourth aspect of the first example method, though the example embodiments are not limited in this respect.

In a sixth aspect of the first example method, determining the information comprises determining the information regarding the one or more properties of the object literal based at least in part on the getter trap that is encountered with regard to one or more recursive function calls that are included in the function, the one or more recursive function calls referencing at least one of the one or more properties. The sixth aspect of the first example method may be implemented in combination with the first, second, third, fourth, and/or fifth aspect of the first example method, though the example embodiments are not limited in this respect.

In a seventh aspect of the first example method, determining the information comprises determining the information regarding the one or more properties of the object literal based at least in part on the getter trap that is encountered with regard to one or more definitions of one or more dynamic properties that are included in the function, the one or more definitions of the one or more dynamic properties indicating at least one of the one or more properties. The seventh aspect of the first example method may be implemented in combination with the first, second, third, fourth, fifth, and/or sixth aspect of the first example method, though the example embodiments are not limited in this respect.

In an eighth aspect of the first example method, the first example method further comprises determining that the object literal is to be a designated type selected from a plurality of types based at least in part on the information. In accordance with the eighth aspect, recommending the content of the code snippet comprises indicating that the object literal is to be the designated type. The eighth aspect of the first example method may be implemented in combination with the first, second, third, fourth, fifth, sixth, and/or seventh aspect of the first example method, though the example embodiments are not limited in this respect.

In a ninth aspect of the first example method, the first example method further comprises providing a tooltip that includes information regarding the content. The ninth aspect of the first example method may be implemented in combination with the first, second, third, fourth, fifth, sixth, seventh, and/or eighth aspect of the first example method, though the example embodiments are not limited in this respect.

In a second example method of intelligently completing a code snippet to define an object literal, information regarding one or more properties of the object literal is determined from one or more comments that are included in code. Content of the code snippet is recommended to define the object literal based at least in part on the information. The content identifies the one or more properties of the object literal.

In a first aspect of the second example method, determining the information comprises inferring one or more names of the one or more respective properties based at least in part on the information.

In a second aspect of the second example method, determining the information comprises inferring one or more syntaxes of the one or more respective properties based at least in part on the information. The second aspect of the second example method may be implemented in combination with the first aspect of the second example method, though the example embodiments are not limited in this respect.

In a third aspect of the second example method, the second example, method further comprises determining that the object literal is to be a designated type selected from a plurality of types based at least in part on the information. In accordance with the third aspect, recommending the content of the code snippet comprises indicating that the object literal is to be the designated type. The third aspect of the second example method may be implemented in combination with the first and/or second aspect of the second example method, though the example embodiments are not limited in this respect.

In a fourth aspect of the second example method, the second example method further comprises providing a tooltip that includes information regarding the content. The fourth aspect of the second example method may be implemented in combination with the first, second, and/or third aspect of the second example method, though the example embodiments are not limited in this respect.

A first example system to intelligently complete a code snippet to define an object literal comprises provision logic configured to provide a proxy object to a function that is included in code. The first example system further comprises determination logic configured to determine information regarding one or more properties of the object literal using global dynamic analysis based at least in part on a getter trap that is encountered during execution of the function with regard to the proxy object. The first example system further comprises recommendation logic configured to recommend content of the code snippet to define the object literal based at least in part on the information, the content identifying the one or more properties of the object literal.

In a first aspect of the first example system, the provision logic is configured to provide the proxy object as an argument to the function. In accordance with the first aspect, the determination logic is configured to determine the information regarding the one or more properties that are requested with respect to the object literal based at least in part on the getter trap that is encountered during the execution of the function with regard to the proxy object.

In a second aspect of the first example system, the determination logic is configured to infer one or more names of the one or more respective properties based at least in part on the information. The second aspect of the first example system may be implemented in combination with the first aspect of the first example system, though the example embodiments are not limited in this respect.

In a third aspect of the first example system, the determination logic is configured to infer one or more syntaxes of the one or more respective properties based at least in part on the information. The third aspect of the first example system may be implemented in combination with the first and/or second aspect of the first example system, though the example embodiments are not limited in this respect.

In a fourth aspect of the first example system, the determination logic is configured to determine the information regarding the one or more properties of the object literal based at least in part on the getter trap that is encountered with regard to one or more nested function calls that are included in the function. The one or more nested function calls reference at least one of the one or more properties. The fourth aspect of the first example system may be implemented in combination with the first, second, and/or third aspect of the first example system, though the example embodiments are not limited in this respect.

In a fifth aspect of the first example system, the determination logic is configured to determine the information regarding the one or more properties of the object literal based at least in part on the getter trap that is encountered with regard to one or more dynamic function calls that are included in the function. The one or more dynamic function calls reference at least one of the one or more properties. The fifth aspect of the first example system may be implemented in combination with the first, second, third, and/or fourth aspect of the first example system, though the example embodiments are not limited in this respect.

In a sixth aspect of the first example system, the determination logic is configured to determine the information regarding the one or more properties of the object literal based at least in part on the getter trap that is encountered with regard to one or more recursive function calls that are included in the function. The one or more recursive function calls reference at least one of the one or more properties. The sixth aspect of the first example system may be implemented in combination with the first, second, third, fourth, and/or fifth aspect of the first example system, though the example embodiments are not limited in this respect.

In a seventh aspect of the first example system, the determination logic is configured to determine the information regarding the one or more properties of the object literal based at least in part on the getter trap that is encountered with regard to one or more definitions of one or more dynamic properties that are included in the function. The one or more definitions of the one or more dynamic properties indicate at least one of the one or more properties. The seventh aspect of the first example system may be implemented in combination with the first, second, third, fourth, fifth, and/or sixth aspect of the first example system, though the example embodiments are not limited in this respect.

In an eighth aspect of the first example system, the determination logic is configured to determine that the object literal is to be a designated type selected from a plurality of types based at least in part on the information.

In accordance with the eighth aspect, the recommendation logic is configured to indicate that the object literal is to be the designated type. The eighth aspect of the first example system may be implemented in combination with the first, second, third, fourth, fifth, sixth, and/or seventh aspect of the first example system, though the example embodiments are not limited in this respect.

In a ninth aspect of the first example system, the first example system further comprises tooltip logic configured to provide a tooltip that includes information regarding the content. The ninth aspect of the first example system may be implemented in combination with the first, second, third, fourth, fifth, sixth, seventh, and/or eighth aspect of the first example system, though the example embodiments are not limited in this respect.

A second example system to intelligently complete a code snippet to define an object literal comprises determination logic configured to determine information regarding one or more properties of the object literal from one or more comments that are included in code. The second example system further comprises recommendation logic configured to recommend content of the code snippet to define the object literal based at least in part on the information. The content identifies the one or more properties of the object literal.

In a first aspect of the second example system, the determination logic is configured to infer one or more names of the one or more respective properties based at least in part on the information.

In a second aspect of the second example system, the determination logic is configured to infer one or more syntaxes of the one or more respective properties based at least in part on the information. The second aspect of the second example system may be implemented in combination with the first aspect of the second example system, though the example embodiments are not limited in this respect.

In a third aspect of the second example system, the determination logic is configured to determine that the object literal is to be a designated type selected from a plurality of types based at least in part on the information. In accordance with the third aspect, the recommendation logic is configured to indicate that the object literal is to be the designated type. The third aspect of the second example system may be implemented in combination with the first and/or second aspect of the second example system, though the example embodiments are not limited in this respect.

In a fourth aspect of the second example system, the second example system further comprises tooltip logic configured to provide a tooltip that includes information regarding the content. The fourth aspect of the second example system may be implemented in combination with the first, second, and/or third aspect of the second example system, though the example embodiments are not limited in this respect.

A first example computer program product comprises a computer-readable storage medium having computer program logic recorded thereon for enabling a processor-based system to intelligently complete a code snippet to define an object literal. The computer program logic comprises first program logic for enabling the processor-based system to provide a proxy object to a function that is included in code. The computer program logic further comprises second program logic for enabling the processor-based system to determine information regarding one or more properties of the object literal using global dynamic analysis based at least in part on a getter trap that is encountered during execution of the function with regard to the proxy object. The computer program logic further comprises third program logic for enabling the processor-based system to recommend content of the code snippet to define the object literal based at least in part on the information. The content identifies the one or more properties of the object literal.

A second example computer program product comprises a computer-readable storage medium having computer program logic recorded thereon for enabling a processor-based system to intelligently complete a code snippet to define an object literal. The computer program logic comprises first program logic for enabling the processor-based system to determine information regarding one or more properties of the object literal from one or more comments that are included in code. The computer program logic further comprises second program logic for enabling the processor-based system to recommend content of the code snippet to define the object literal based at least in part on the information. The content identifies the one or more properties of the object literal.

V. Example Computer System

Figure 12:
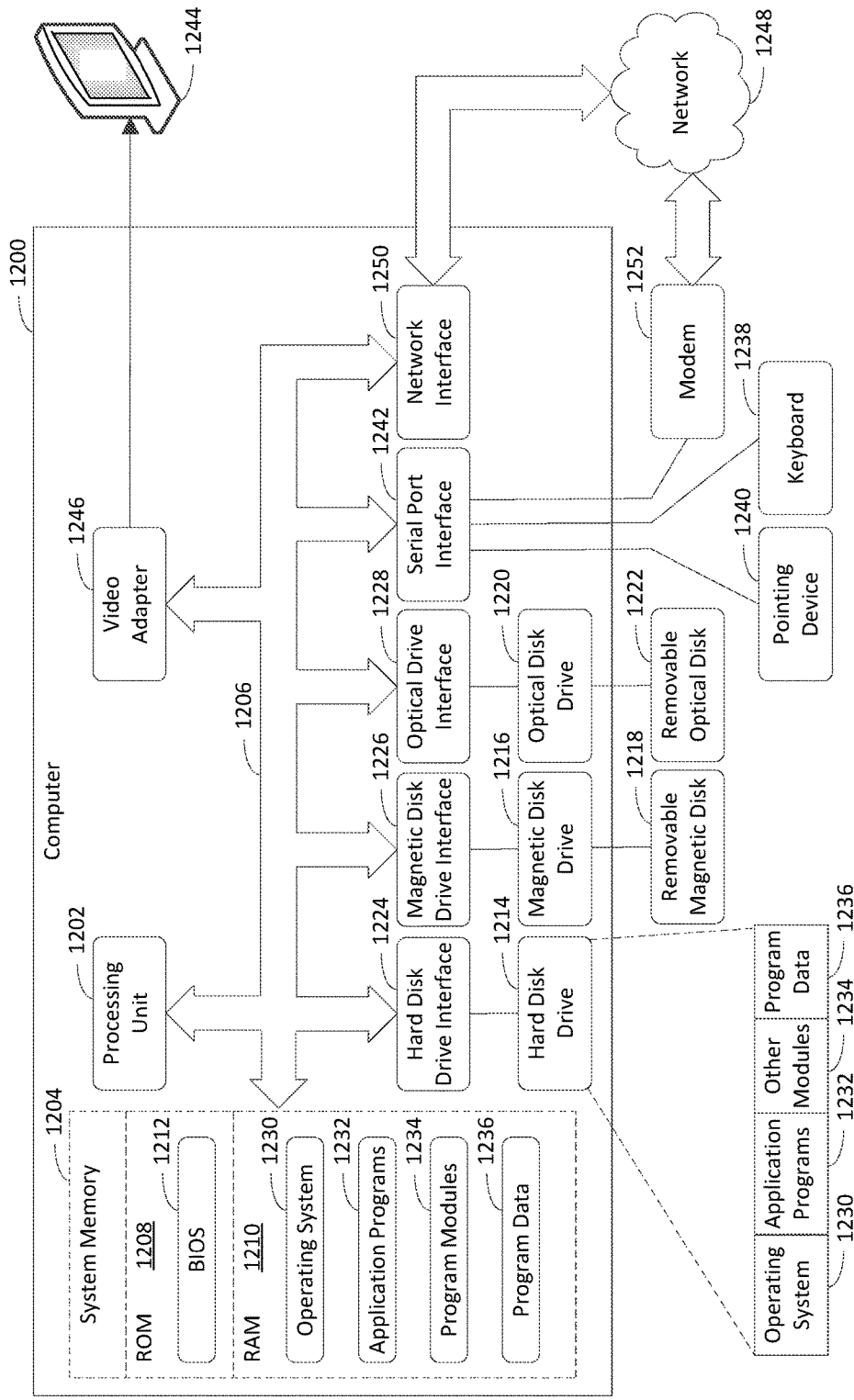
FIG. 12 depicts an example computer in which embodiments may be implemented.

FIG. 12 depicts an example computer 1200 in which embodiments may be implemented. Any one or more of user systems 102A-102M and/or any one or more of file servers 106A-106N shown in FIG. 1 and/or computing system 1100 shown in FIG. 11 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing any one or more of object literal recommendation logic 108, object literal recommendation logic 1102, store 1104, provision logic 1106, determination logic 1108, recommendation logic 1110, tooltip logic 1112, flowchart 200 (including any step of flowchart 200), and/or flowchart 900 (including any step of flowchart 900), as described herein.

A user may enter commands and information into the computer 1200 through input devices such as keyboard 1238 and pointing device 1240. Other input devices (not shown) may include a microphone, joystick, game pad, satellite dish, scanner, touch screen, camera, accelerometer, gyroscope, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 (e.g., a monitor) is also connected to bus 1206 via an interface, such as a video adapter 1246. In addition to display device 1244, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable storage medium" are used to generally refer to media (e.g., non-transitory media) such as the hard disk associated with hard disk drive 1214, removable magnetic disk 1218, removable optical disk 1222, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

VI. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to complete a code snippet to define an object literal, the system comprising:
   memory; and
   one or more processors coupled to the memory, the one or more processors configured to:
      provide a proxy object to a function that is included in code;
      perform global dynamic analysis by using a getter trap that is included in the proxy object to extract information
      regarding one or more properties of the object literal from the code, which includes the function; and
      generate a recommendation that recommends content for completion of the code snippet to define the object literal based at least in part on the information, the content identifying the one or more properties of the object literal.

2. The system of claim 1, wherein the one or more processors are configured to:
   provide the proxy object as an argument to the function; and
   perform the global dynamic analysis by using the getter trap, which is included in the proxy object, to extract the information regarding the one or more properties that are requested with respect to the object literal from the code.

3. The system of claim 1, wherein the one or more processors are configured to infer one or more names of the one or more respective properties based at least in part on the information.

4. The system of claim 1, wherein the one or more processors are configured to infer one or more syntaxes of the one or more respective properties based at least in part on the information.

5. The system of claim 1, wherein the one or more processors are configured to perform the global dynamic analysis by using the getter trap, which is included in the proxy object, to extract information regarding at least one property of the one or more properties of the object literal from one or more nested function calls that are included in the function, the one or more nested function calls referencing the at least one property.

6. The system of claim 1, wherein the one or more processors are configured to perform the global dynamic analysis by using the getter trap, which is included in the proxy object, to extract information regarding at least one property of the one or more properties of the object literal from one or more dynamic function calls that are included in the function, the one or more dynamic function calls referencing the at least one property.

7. The system of claim 1, wherein the one or more processors are configured to perform the global dynamic analysis by using the getter trap, which is included in the proxy object, to extract information regarding at least one property of the one or more properties of the object literal from one or more recursive function calls that are included in the function, the one or more recursive function calls referencing the at least one property.

8. The system of claim 1, wherein the one or more processors are configured to perform the global dynamic analysis by using the getter trap, which is included in the proxy object, to extract information regarding at least one property of the one or more properties of the object literal from one or more definitions of one or more dynamic properties that are included in the function, the one or more definitions of the one or more dynamic properties indicating the at least one property.

9. The system of claim 1, wherein the one or more processors are configured to:
determine that the object literal is to be a designated type selected from a plurality of types based at least in part on the information; and
indicate that the object literal is to be the designated type.

10. The system of claim 1, wherein the one or more processors are configured to provide a tooltip that includes information regarding the content.

11. A system to complete a code snippet to define an object literal, the system comprising:
memory; and
one or more processors coupled to the memory, the one or more processors configured to:
determine information regarding one or more properties of the object literal from one or more comments that are included in code; and
generate a recommendation that recommends content for completion of the code snippet to define the object literal based at least in part on the information,
the content identifying the one or more properties of the object literal.

12. The system of claim 11, wherein the one or more processors are configured to infer one or more names of the one or more respective properties based at least in part on the information.

13. The system of claim 11, wherein the one or more processors are configured to infer one or more syntaxes of the one or more respective properties based at least in part on the information.

14. The system of claim 11, wherein the one or more processors are configured to:
determine that the object literal is to be a designated type selected from a plurality of types based at least in part on the information; and
indicate that the object literal is to be the designated type.

15. The system of claim 11, wherein the one or more processors are configured to provide a tooltip that includes information regarding the content.

16. A method of completing a code snippet to define an object literal, the method comprising:
providing a proxy object to a function that is included in code;
performing global dynamic analysis by using a getter trap that is included in the proxy object to extract information
regarding one or more properties of the object literal from the code, which includes the function; and
generating a recommendation that recommends content for completion of the code snippet to define the object literal based at least in part on the information,
the content identifying the one or more properties of the object literal.

17. The method of claim 16, wherein performing the global dynamic analysis comprises:
inferring at least one of (a) one or more names of the one or more respective properties based at least in part on the information or (b) one or more syntaxes of the one or more respective properties based at least in part on the information.

18. The method of claim 16, wherein performing the global dynamic analysis comprises:
performing the global dynamic analysis by using the getter trap, which is included in the proxy object, to extract information regarding at least one property of the one or more properties of the object literal from at least one of (a) one or more nested function calls, (b) one or more dynamic function calls, or (c) one or more recursive function calls that are included in the function and that reference the at least one property.

19. The method of claim 16, wherein performing the global dynamic analysis comprises:
performing the global dynamic analysis by using the getter trap, which is included in the proxy object, to extract information regarding at least one property of the one or more properties of the object literal from one or more definitions of one or more dynamic properties that are included in the function, the one or more definitions of the one or more dynamic properties indicating the at least one property.

20. The method of claim 16, further comprising:
determining that the object literal is to be a designated type selected from a plurality of types based at least in part on the information;
wherein generating the recommendation that recommends the content for the completion of the code snippet comprises:
indicating that the object literal is to be the designated type.

* * * * *